United States Patent
Strandborg et al.

(10) Patent No.: US 12,190,444 B2
(45) Date of Patent: Jan. 7, 2025

(54) IMAGE-BASED ENVIRONMENT RECONSTRUCTION WITH VIEW-DEPENDENT COLOUR

(71) Applicant: Varjo Technologies Oy, Helsinki (FI)

(72) Inventors: Mikko Strandborg, Hangonkylä (FI); Kimmo Roimela, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 174 days.

(21) Appl. No.: 18/111,299

(22) Filed: Feb. 17, 2023

(65) Prior Publication Data

US 2024/0282050 A1    Aug. 22, 2024

(51) Int. Cl.
| | |
|---|---|
| *G06T 17/00* | (2006.01) |
| *G06T 7/11* | (2017.01) |
| *G06T 7/13* | (2017.01) |
| *G06T 7/90* | (2017.01) |
| *G06V 10/74* | (2022.01) |
| *G06V 10/82* | (2022.01) |

(52) U.S. Cl.
CPC .............. *G06T 17/00* (2013.01); *G06T 7/11* (2017.01); *G06T 7/13* (2017.01); *G06T 7/90* (2017.01); *G06V 10/761* (2022.01); *G06V 10/82* (2022.01); *G06T 2207/10024* (2013.01); *G06T 2207/10028* (2013.01); *G06T 2207/20081* (2013.01)

(58) Field of Classification Search
CPC ... G06T 17/00; G06T 7/11; G06T 7/13; G06T 7/90; G06T 2207/10024; G06T 2207/10028; G06T 2207/20081; G06V 10/761; G06V 10/82
See application file for complete search history.

(56) References Cited

U.S. PATENT DOCUMENTS

| | | | | |
|---|---|---|---|---|
| 2018/0310025 | A1* | 10/2018 | Keränen | G06T 17/005 |
| 2019/0279423 | A1* | 9/2019 | Murray | G06F 30/00 |
| 2022/0245910 | A1* | 8/2022 | Lombardi | G06T 13/40 |

* cited by examiner

*Primary Examiner* — Said Broome
*Assistant Examiner* — Andrew Shin
(74) *Attorney, Agent, or Firm* — Ziegler IP Law Group LLC.

(57) ABSTRACT

Disclosed is a method and system for: obtaining 3D data structure comprising nodes, each node representing voxel of 3D grid of voxels, wherein node stores viewpoint information, with any of: (i) colour tile that captures colour information of voxel and depth tile, (ii) reference information indicative of unique identification of colour and depth tiles; utilising 3D data structure for training neural network(s), wherein input of neural network(s) comprises 3D position of point in real-world environment and output of neural network(s) comprises colour and opacity of point; and for new viewpoint, determining visible nodes whose voxels are visible from new viewpoint; for visible node, selecting depth tile(s) whose viewpoint(s) matches new viewpoint most closely; reconstructing 2D geometry of objects from depth tiles; and utilising neural network(s) to render colours for pixels of output colour image.

19 Claims, 6 Drawing Sheets

IMAGE-BASED ENVIRONMENT RECONSTRUCTION WITH VIEW-DEPENDENT COLOUR

TECHNICAL FIELD

The present disclosure relates to computer-implemented methods for image-based environment reconstruction with view-dependent colours. The present disclosure also relates to systems for image-based environment reconstruction with view-dependent colours. The present disclosure further relates to computer program products for image-based environment reconstruction with view-dependent colours.

BACKGROUND

With advancements in evolving technologies such as immersive extended-reality (XR) technologies, demand for high-quality image generation has been increasing. It is desired that the image generation is performed in real time or near-real time. Several advancements are being made to develop image generation techniques that facilitate high-quality and realistic three-dimensional (3D) reconstruction of a real-world environment. Some existing image generation techniques typically rely on environment reconstruction using 3D point clouds, 3D meshing, machine learning (ML)-based approaches (for example, such as Neural Radiance Fields (NeRFs), Instant Neural Graphics Primitives (Instant-NGP), and the like), image-based techniques, and the like.

However, existing techniques and equipment for implementing 3D reconstruction are associated with several limitations. Firstly, the existing techniques are inefficient in terms of managing a memory budget for storing data structures comprising information pertaining to a 3D space of the real-world environment. In such a case, when these data structures are employed as input for generating images from new viewpoints, image reconstruction is performed with considerable latency/delay. Moreover, when it is required to perform the image reconstruction in real time, the existing techniques cannot be scaled up to a high enough quality (namely, high image resolution) on the existing equipment. For example, an image resolution provided by a 3D data structure is limited by an underlying 3D voxel grid, making scaling to higher resolutions extremely expensive. This also adversely impacts viewing experiences provided by the evolving XR technologies which utilize the images generated using such data structures. Secondly, some existing techniques implement the 3D reconstruction, for example, using a static 3D mesh which cannot be updated easily. Thus, image reconstruction cannot be performed in real time or near-real time, and processing resources and time required for updating the static 3D mesh are considerably high. Furthermore, storing redundant object information into the data structures makes such data structures very bulky to use.

Thirdly, some existing techniques are capable of real-time 3D reconstruction and rendering, but unfortunately suffer from inaccuracies and missing details in depth information. This causes extreme degradation of image quality in reconstructed images where accurate depth information is of utmost importance. Fourthly, even though neural networks like NeRF are capable of generating high quality images, they are not fast enough for real-time rendering of high-resolution images that are suitable for XR applications. In addition to this, training of such neural networks is resource-intensive and time-consuming, as the neural networks are trained to reproduce an entire 3D volume of the real-world environment being captured. Furthermore, such neural networks do not directly support dynamic content, as representation of a real-world scene of the real-world environment is encoded into weights of such neural networks.

Therefore, in light of the foregoing discussion, there exists a need to overcome the aforementioned drawbacks associated with existing techniques and equipment for implementing 3D reconstruction.

SUMMARY

The present disclosure seeks to provide a computer-implemented method for image-based environment reconstruction with view-dependent colour. The present disclosure also seeks to provide a system for image-based environment reconstruction with view-dependent colour. The present disclosure further seeks to provide a computer program product for image-based environment reconstruction with view-dependent colour. An aim of the present disclosure is to provide a solution that overcomes at least partially the problems encountered in prior art.

In a first aspect, an embodiment of the present disclosure provides a computer-implemented method comprising:
   obtaining a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
   (i) a given colour tile of the given colour image that captures colour information of a given voxel represented by the given node and a corresponding depth tile of the given depth image that captures depth information of the given voxel from a perspective of the given viewpoint,
   (ii) reference information indicative of unique identification of the given colour tile and the corresponding depth tile;
   utilising the 3D data structure for training at least one neural network, wherein a given input of the at least one neural network comprises information indicative of a 3D position of a given point in the given real-world environment and a given output of the at least one neural network comprises a colour and an opacity of the given point; and
   for a new viewpoint from a perspective of which a given output colour image is to be reconstructed,
      determining a set of visible nodes in the 3D data structure whose corresponding voxels are visible from the new viewpoint;
      for a given visible node of said set, selecting, from amongst depth tiles of the given visible node, at least one depth tile whose corresponding viewpoint matches the new viewpoint most closely;
      reconstructing, from depth tiles that are selected for each visible node of said set, a two-dimensional (2D) geometry of objects represented by pixels of the given output colour image; and
      utilising the at least one neural network to render colours for the pixels of the given output colour image.

In a second aspect, an embodiment of the present disclosure provides a system comprising at least one server, wherein the at least one server is configured to:
obtain a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
(i) a given colour tile of the given colour image that captures colour information of a given voxel represented by the given node and a corresponding depth tile of the given depth image that captures depth information of the given voxel from a perspective of the given viewpoint,
(ii) reference information indicative of unique identification of the given colour tile and the corresponding depth tile;
utilise the 3D data structure to train at least one neural network, wherein a given input of the at least one neural network comprises information indicative of a 3D position of a given point in the given real-world environment and a given output of the at least one neural network comprises a colour and an opacity of the given point; and
for a new viewpoint from a perspective of which a given output colour image is to be reconstructed,
determine a set of visible nodes in the 3D data structure whose corresponding voxels are visible from the new viewpoint;
for a given visible node of said set, select, from amongst depth tiles of the given visible node, at least one depth tile whose corresponding viewpoint matches the new viewpoint most closely;
reconstruct, from depth tiles that are selected for each visible node of said set, a two-dimensional (2D) geometry of objects represented by pixels of the given output colour image; and
utilise the at least one neural network to render colours for the pixels of the given output colour image.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

Embodiments of the present disclosure substantially eliminate or at least partially address the aforementioned problems in the prior art, and facilitate in fast and efficient training of neural network(s) by using a space-efficient 3D data structure that is based on image tiles, thereby enabling accurate and realistic generation of output colour images, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2B is a schematic representation of how the colour image can be divided into a plurality of colour tiles, while

FIG. 4B illustrates a mean surface normal of a surface of an object present in the voxel, while

Figure 1:
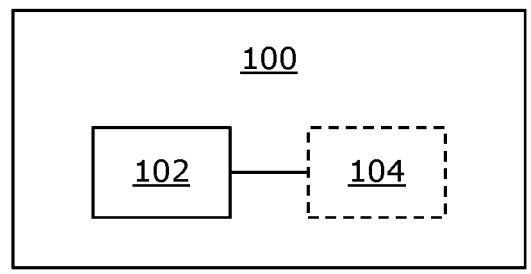
FIG. 1 illustrates a block diagram of an architecture of a system for image-based environment reconstruction with view-dependent colour, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
obtaining a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
(i) a given colour tile of the given colour image that captures colour information of a given voxel represented by the given node and a corresponding depth tile of the given depth image that captures depth information of the given voxel from a perspective of the given viewpoint,
(ii) reference information indicative of unique identification of the given colour tile and the corresponding depth tile;
utilising the 3D data structure for training at least one neural network, wherein a given input of the at least one neural network comprises information indicative of a 3D position of a given point in the given real-world environment and a given output of the at least one neural network comprises a colour and an opacity of the given point; and
for a new viewpoint from a perspective of which a given output colour image is to be reconstructed,
determining a set of visible nodes in the 3D data structure whose corresponding voxels are visible from the new viewpoint;
for a given visible node of said set, selecting, from amongst depth tiles of the given visible node, at least one depth tile whose corresponding viewpoint matches the new viewpoint most closely;
reconstructing, from depth tiles that are selected for each visible node of said set, a two-dimensional (2D) geometry of objects represented by pixels of the given output colour image; and
utilising the at least one neural network to render colours for the pixels of the given output colour image.

In a second aspect, an embodiment of the present disclosure provides a system comprising at least one server, wherein the at least one server is configured to:
obtain a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
(i) a given colour tile of the given colour image that captures colour information of a given voxel represented by the given node and a corresponding depth tile of the given depth image that captures depth information of the given voxel from a perspective of the given viewpoint,
(ii) reference information indicative of unique identification of the given colour tile and the corresponding depth tile;
utilise the 3D data structure to train at least one neural network, wherein a given input of the at least one neural network comprises information indicative of a 3D position of a given point in the given real-world environment and a given output of the at least one neural network comprises a colour and an opacity of the given point; and
for a new viewpoint from a perspective of which a given output colour image is to be reconstructed,
determine a set of visible nodes in the 3D data structure whose corresponding voxels are visible from the new viewpoint;
for a given visible node of said set, select, from amongst depth tiles of the given visible node, at least one depth tile whose corresponding viewpoint matches the new viewpoint most closely;
reconstruct, from depth tiles that are selected for each visible node of said set, a two-dimensional (2D) geometry of objects represented by pixels of the given output colour image; and
utilise the at least one neural network to render colours for the pixels of the given output colour image.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

The present disclosure provides the aforementioned method, the aforementioned system, and the aforementioned computer program product for facilitating fast and efficient training of neural network(s) by using a space-efficient 3D data structure that is based on image tiles, thereby enabling accurate and realistic generation of output colour images, in real time or near-real time. The method enables in creating the 3D data structure that is space-efficient and is susceptible to be used for reconstructing output colour images from various new viewpoints. The method and the system are more memory-efficient as compared to the prior art, when the reference information pertaining to colour tiles and depth tiles is stored in the nodes of the 3D data structure. Moreover, the reference information does not include any redundancy, and can be updated easily in the 3D data structure. The method can be easily scaled up to a high enough quality on existing equipment. For the given output colour image, the 2D geometry of the objects is easily reconstructed using the depth tiles from the 3D data structure (i.e., without a need to utilise the at least one neural network), and thus the at least one neural network is utilised to just render the colours for the pixels of the given output colour image. This requires considerably lesser processing resources and processing time of the at least one server, and lesser training time for the at least one neural network. Furthermore, upon training the at least one neural network, volume rendering can be performed by the at least one neural network for generating high-quality output colour images, along with compensating for inaccuracies and missing details in depth information. The method and the system are simple, robust, support real-time high-quality 3D reconstruction, and can be implemented with ease.

Notably, the at least one server controls an overall operation of the system. In some implementations, the at least one server is implemented as a remote server. In such implementations, the remote server may obtain the 3D data structure from at least one data repository. In an example, the remote server could be a cloud server that provides a cloud computing service. In other implementations, the at least one server is implemented as a processor of a computing device. In such implementations, said processor may obtain the 3D data structure from the at least one data repository. Examples of the computing device include, but are not limited to, a laptop, a desktop, a tablet, a phablet, a personal digital assistant, a workstation, and a console.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to utilise the 3D data structure for training the at least one neural network, and a second server from amongst the plurality of servers may be configured to reconstruct the 2D geometry of the objects represented by the pixels of the given output colour image.

Optionally, the system further comprises the at least one data repository that is communicably coupled to the at least one server. Optionally, the at least one data repository stores the 3D data structure. It will be appreciated that the at least one data repository could be implemented, for example, such as a memory of the at least one server, a memory of the computing device, a removable memory, a cloud-based database, or similar. It will also be appreciated that instead of obtaining the 3D data structure from the at least one data repository, the at least one server could create the 3D data structure using colour images, depth images, and viewpoint information, as discussed later in detail.

Throughout the present disclosure, the term "voxel" refers to a 3D volumetric element that constitutes a portion of the 3D space occupied by the given real-world environment. Multiple voxels can be employed to represent the 3D space occupied by the given real-world environment. A given voxel corresponding to the portion of the 3D space represents colour information pertaining to the portion of the 3D space, and additionally optionally other attributes associated with the portion of the 3D space (for example, such as depth information, luminance information, transparency information, opacity information, and the like). The given voxel can be considered to be a 3D equivalent of a pixel. A shape of the given voxel could be a cube, a cuboid or some other convex polyhedron. Voxels are well-known in the art.

It will be appreciated that a number of nodes in the 3D data structure is equal to a number of voxels in the 3D grid of voxels. Moreover, a given 3D region in the 3D space (represented by at least one voxel) may correspond to more than one node of the 3D data structure. Examples of the 3D data structure include, but are not limited to, an octree, a Binary Space Partitioning (BSP) tree, a Quadtree, a bounding volume hierarchy (BVH), and hashed voxels. It will also be appreciated that a given node of the 3D data structure could be an oriented bounding box (OBB), an axis-aligned bounding box (AABB), a discrete oriented polytope (DOP), or similar.

It is to be understood that the given colour image is a visual representation of the given real-world environment. The term "visual representation" encompasses colour information represented in the given colour image, and additionally optionally other attributes associated with the given colour image (for example, such as depth information, luminance information, transparency information, and the like). Optionally, the colour information represented in the given colour image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

Furthermore, the term "depth image" refers to an image comprising information pertaining to optical depths of objects or their parts present in the given real-world environment. In other words, the given depth image provides information pertaining to distances (namely, the optical depths) of surfaces of the objects or their parts from a given viewpoint and a given viewing direction of at least one camera capturing the given depth image. In an example, the given depth image could be an image comprising a plurality of pixels, wherein a pixel value of each pixel in said image indicates an optical depth of its corresponding real-world point/region within the given real-world environment. The term "object" refers to a physical object or a part of the physical object present in the given real-world environment. The object could be a living object (for example, such as a human, a pet, a plant, and the like) or a non-living object (for example, such as a wall, a window, a toy, a poster, a lamp, and the like).

In some implementations, a resolution of the given colour image is same as a resolution of the given depth image. In this regard, a number of pixels in the given colour tile and a number of pixels in the given depth tile are same. In other implementations, a resolution of the given colour image is different from a resolution of the given depth image. Optionally, the resolution of the given colour image is greater than the resolution of the given depth image. In this regard, the number of pixels in the given colour tile are greater than the number of pixels in the given depth tile.

Throughout the present disclosure, the term "viewpoint" encompasses both a viewing position at which the at least one camera is positioned in the given real-world environment as well as a viewing direction in which the at least one camera is capturing the given colour image and the given depth image. It will be appreciated that multiple objects or their parts present in the given real-world environment span across a field of view of the at least one camera; therefore, for the given colour image and the given depth image that are captured from a given viewpoint, light reflecting off these multiple objects or their parts is incident upon a sensor chip of the at least one camera at different incident angles. As an example, when an angular width of a horizontal field of view of the at least one camera is 90 degrees, said objects or their parts are captured in the given colour image and the given depth image such that information pertaining to the multiple objects or their parts is captured from −45 degrees to +45 degrees from a centre of the horizontal field of view. Thus, a given viewpoint from which a given object or its part is captured not only depends on the viewing position and the viewing direction of the at least one camera, but also depends on which portion of the field of view of the at least one camera is the given object or its part captured. Information pertaining to the at least one camera will be discussed later in detail.

Throughout the present disclosure, the term "tile" of a given image refers to a segment of the given image. It will be appreciated that a given tile of the given image has a defined shape and/or size. In an example, a size of the given tile may be 32×32 pixels. In another example, a size of the given tile may be 50×100 pixels. Herein, the term "given tile" encompasses the given colour tile and/or the given depth tile, and the term "given image" encompasses the given colour image and/or the given depth image.

Notably, the given node of the 3D data structure either stores the given colour tile and the corresponding depth tile, or only stores the reference information of the given colour tile and the corresponding depth tile. Beneficially, storing only the reference information facilitates in representing the 3D space of the given real-world environment using the 3D data structure in a highly space-efficient manner, because the amount of computing resources (for example, such as memory) required for processing the 3D data structure is reduced.

It will be appreciated that the given colour image and the given depth image could be identified using a running number index of the given colour image and of the given depth image, respectively. Optionally, the unique identification of the given tile of the given image (namely, the given colour tile of the given colour image and/or the given depth tile of the given depth image) comprises any one of:
- position coordinates of at least one of four corners of the given tile of the given image,
- a row number and a column number of the given tile of the given image,
- position coordinates and dimensions in an atlas image, when tiles of the given image are packed into the atlas image.

As an example, when the tiles are equi-sized, position coordinates of only one corner, for example, a left upper corner of the given tile is required for the unique identification. It will be appreciated that information pertaining to the row number and the column number of the given tile may require lesser number of bits, as compared to position coordinates. Hereinabove, the term "atlas image" refers to a type of image in which the colour tiles and the depth tiles are arranged (namely, packed), for example, in a space-efficient manner.

Optionally, in the method, the step of obtaining the 3D data structure comprises:
- receiving a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
- dividing the 3D space occupied by the given real-world environment into the 3D grid of voxels, wherein the 3D grid is represented in the given coordinate system;
- creating the 3D data structure;
- dividing the given colour image and the given depth image into a plurality of colour tiles and a plurality of depth tiles, respectively, wherein the plurality of depth tiles correspond to respective ones of the plurality of colour tiles;
- mapping the given colour tile of the given colour image to the given voxel in the 3D grid whose colour information is captured in the given colour tile, based on the given viewpoint and the depth information captured in the corresponding depth tile of the given depth image; and
- storing, in the given node of the 3D data structure that represents the given voxel, the given viewpoint information indicative of the given viewpoint, along with any of: (i) the given colour tile and the corresponding depth tile, (ii) the reference information.

Optionally, the at least one server is configured to receive the plurality of colour images and the plurality of depth images from the at least one data repository, or from a device comprising the at least one camera. Examples of the device include, but are not limited to, a head-mounted display (HMD) device and a teleport device. The term "head-mounted display" device refers to a specialized equipment that is configured to present an extended-reality (XR) environment to a user when said HMD device, in operation, is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation. It will be appreciated that the at least one server can also be implemented as a processor of the device comprising the at least one camera.

The term "camera" refers to an equipment that is operable to detect and process light signals received from the given real-world environment, so as to capture image(s) of the given real-world environment. Such images could be colour images and/or depth images of the given real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

In some implementations, both the given colour image and the given depth image are captured using a single camera. As an example, the aforesaid images may be captured as an RGB-D image using the single camera. In other implementations, the given colour image and the given depth image are captured separately by using separate cameras. As an example, the given colour image may be captured by an RGB camera, while the given depth image may be captured by a ToF camera. In yet other implementations, the given colour image is captured using at least one visible-light camera, and the given depth image is generated (for example, by the at least one server) using one of:
- stereo disparity between a stereo pair of visible-light images captured by the at least one visible-light camera,
- a 3D model of the given real-world environment and a viewpoint of the at least one camera, the 3D model being a data structure comprising comprehensive information pertaining to the 3D space of the given real-world environment.

It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the given depth image could be generated even without using the depth camera. In this regard, the given depth image could be generated by using a monocular depth estimation technique, wherein a single (monocular) RGB image is used for estimating depth values to generate the given depth image.

Optionally, a given depth image is generated using fusion. In this regard, when a sequence of depth images are captured by the at least one camera from a same viewpoint (by assuming that only static objects are present in the given real-world environment), an optical depth of points on a surface of a given static object can be determined as a running average of optical depths of those points represented in the sequence of depth images. It is to be understood that when capturing the sequence of depth images from the same viewpoint, a distance and a relative pose between the given static object and the at least one camera remain constant (i.e., unchanged).

Optionally, the system further comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, a processor of the device is configured to process tracking data, collected by the tracking means, for tracking the viewpoints of the at least one camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the at least one camera is arranged on the device present in the given real-world environment. Such a device could be arranged at a fixed location within the given real-world environment. Optionally, in such a case, the device is stationary in the given real-world environment. Additionally or alternatively, the device could be a wearable device being worn by a user present in the given real-world environment. In such a case, a location of the device changes with a change in a location of its user. Likewise, the device could be arranged on, for example, a drone, a robot, or similar. As an example, the device could be arranged on a support structure that is capable of a 3D rotation (and additionally, capable of a translation motion). The support structure can be moved to any required location in the given real-world environment.

Beneficially, the at least one camera is movable in the given real-world environment, so as to capture the plurality of colour images and the plurality of depth images from a plurality of viewpoints. In this regard, a pose of the at least one camera changes, i.e., at least an orientation of the at least one camera changes with respect to time. It will be appreciated that at least the orientation of the at least one camera may be adjusted (namely, changed) by using a motorised actuator. In such a case, information pertaining to at least the orientation of the at least one camera can be accurately known to the at least one server. The actuator may be driven by an actuation signal, for example, such as a piezoelectric force, an electromagnetic force, a mechanical torque, an electric current, or similar. Notably, different poses of the at least one camera serve as different (known) viewpoints for capturing the plurality of colour images and the plurality of depth images. The term "pose" encompasses both a position and an orientation. A 3D orientation of a given viewpoint corresponds to a direction of a depth axis of a given image from a 3D position of the at least one camera.

Optionally, the given coordinate system defines a position and an orientation of a given viewpoint (from which the given colour image and the given depth image are captured) within the 3D space of the given real-world environment. As an example, the given coordinate system may be a Cartesian coordinate system. Optionally, the given coordinate system has a predefined origin and three mutually perpendicular coordinate axes. The three mutually perpendicular coordinate axes could be, for example, X, Y, and Z axes. Optionally, in this regard, a 3D position of the given viewpoint in the given coordinate system is expressed as (x, y, z) position coordinates along the X, Y and Z axes, respectively. Likewise, an orientation of the given viewpoint in the given coordinate system could be expressed, for example, using rotation quaternions, Euler angles, rotation matrices, and the like.

Optionally, the at least one server is configured to divide the 3D space into the 3D grid of voxels using a space partitioning scheme. Examples of the space partitioning scheme include, but are not limited to, an Octree (including a Sparse Voxel Octree) Partitioning scheme, a Binary Space Partitioning (BSP) scheme, a Quadtree Partitioning scheme, a k-dimensional tree partitioning scheme, a bounding volume hierarchy (BVH) partitioning scheme, and a voxel hashing scheme. The 3D grid of voxels enables in effectively modelling the 3D space of the given real-world environment. The technical benefit of representing the 3D grid in the given coordinate system is that a location of the given voxel in the 3D grid can be easily identified by the at least one server. It will be appreciated that the 3D grid of voxels may be a regular 3D grid or an irregular 3D grid. However, the regular 3D grid is relatively easier to employ as compared to the irregular 3D grid because tessellation of the regular 3D grid is regular. Examples of the 3D data structure have already been described earlier, and creating the 3D data structure is well-known in the art.

Optionally, the given colour image and the given depth image are divided into the plurality of colour tiles and the plurality of depth tiles, respectively, in a manner that a number of colour tiles is equal to a number of depth tiles. In other words, a grid of colour tiles of the given colour image exactly matches with a grid of depth tiles of the given depth image both in a horizontal direction and a vertical direction. In this regard, colour information represented in the given colour tile and depth information represented in the given depth tile correspond to a same real-world region of the given real-world environment. Optionally, when dividing the given colour image and the given depth image, the at least one server is configured to employ at least image processing algorithm. Optionally, the at least image processing algorithm is at least one of: an image slicing algorithm, an image cropping algorithm, an image segmentation algorithm.

Further, optionally, when mapping the given colour tile to the given voxel, the given voxel is associated with (namely, linked to) the given colour tile as the colour information of the given voxel is captured in the given colour tile. Since optical depths (i.e., the depth information) in the corresponding depth tile of the given depth image and (a 3D position and an orientation of) the given viewpoint are known, the at least one server can easily and accurately ascertain the given voxel in the 3D grid to which the given colour tile is to be mapped. Therefore, the at least one server ascertains a location of the given voxel in the 3D grid whose colour information is captured in the given colour tile. In this regard, at least one of: coordinate geometry-based formula, trigonometry-based formula is employed for determining the location of the given voxel in the 3D grid.

Upon mapping the given colour tile to the given voxel, the given node of the 3D data structure is populated with the given viewpoint information corresponding to the given colour image and the given depth image, and with any of: the reference information, or the given colour tile and the corresponding depth tile. In some implementations, the given node does not actually store the given colour tile and the given depth tile, but instead stores only the reference information, which provides a unique identification of the given colour tile and the given depth tile. Beneficially, this facilitates in saving space at the at least one data repository in which the 3D data structure is stored. Moreover, image reconstruction can be performed photo-realistically in real time or near-real time, and in a bandwidth-efficient manner using the 3D data structure. Furthermore, storing the viewpoint information is also beneficial since the viewpoint information is utilized for selecting at least one colour tile and at least one depth tile at a time of training the at least one neural network using the 3D data structure.

Notably, the at least one neural network is trained by using the 3D data structure. Since nodes of the 3D data structure comprise the viewpoint information corresponding to the given colour image and the given depth image along with any of: the reference information, or the colour tiles and the depth tiles, the 3D data structure is served as a training dataset to the at least one neural network. This is because the data structure comprises comprehensive information pertaining to the 3D space of the real-world environment. During the aforesaid training, the at least one neural network learns from the comprehensive information in the 3D data structure in order to be able to map the given input to the given output. Neural networks and their training is well-known in the art.

It will be appreciated that the given input may also include other parameters, in addition to the information indicative of the 3D position of the given point in the given real-world environment. Optionally, in this regard, the given input of the at least one neural network further comprises a given viewing direction. In such a case, the given output comprises the colour of the given point with respect to the given viewing direction. In other words, the colour of the given point would be a view-dependent colour (or view-dependent irradiance at the given point) i.e., the colour of the given point depends on the given viewing direction from which the 3D position is being viewed.

Optionally, the at least one neural network is implemented as a Neural Radiance Field (NeRF) model. Typically, the NeRF model is a deep fully-connected neural network (namely, a machine learning-based model) without any convolutional layers (also referred to as a multilayer perceptron (MLP)). It will be appreciated that when the NeRF model is employed, the given input comprises the information indicative of the 3D position as well as the given viewing direction, and the given output comprises the (view-dependent) colour and the opacity of the given point. Such a NeRF model is described, for example, in "*NeRF: representing scenes as neural radiance fields for view synthesis*" by Ben Mildenhall et al., published in Proceedings of the European Conference on Computer Vision (ECCV), 2020, which has been incorporated herein by reference. It will be appreciated that any type of neural network (upon training) that could reproduce the given real-world environment, either via novel-view synthesis or by producing a 3D mesh or a 3D point cloud, can be implemented.

In an example, when the at least one neural network is implemented as the NeRF model, using the aforementioned reference for sake of clarity and convenience, the colour of the given point can be mathematically expressed as:

$$C(r) = \int_{tn}^{tf} T(t)\sigma(r(t))c(r(t), d)dt$$

wherein

C(r) is the colour of the given point,

T(t) is an intensity of light that has been blocked till a point 't',

σ(r(t)) is density at the point 't', c(r(t),d) is colour at a point r(t) with respect to a viewing angle 'd', tn is an upper bound for a given ray, and tf is a lower bound for the given ray.

Optionally, the information indicative of the 3D position of the given point is in form of a 3D position in the given coordinate system. Such a 3D position can be represented as (x, y, z) position coordinates along the X, Y and Z axes, respectively. Additionally, when the at least one neural network is implemented as the NeRF model, the aforesaid information could, for example, be represented as (x, y, z, θ, φ), wherein (x, y, z) are the position coordinates as mentioned above, and (θ, φ) are orientation angles with respect to any two of the aforesaid axes. In case of the NeRF model, the position coordinates and the orientation angles correspond to extrinsic parameters of the at least one camera.

Furthermore, optionally, the colour of the given point is represented by a colour value. Such a colour value could, for example, be an RGB value, an RGB-A value, a CMYK value, a YUV value, an RGB-D value, an HCL value, an HSL value, an HSB value, an HSV value, an HSI value, a YCbCr value, or similar. Optionally, the opacity of the given point is represented by an alpha value. Alpha values are well-known in the art. Greater the alpha value, greater is the opacity of the given point, and lower is the transparency of the given point, and vice versa. In addition to this, greater the opacity of the given point, greater is the density of the given point. A non-zero density of the given point means that the given point in the 3D space could be occupied by an opaque object or its part. It is to be understood that when the opacity of the given point is zero or nearly zero, it means the 3D region in the 3D space could either be empty (i.e., surrounded by air), or be occupied by a transparent object or its part.

It will be appreciated that the given input to the at least one neural network could be encoded to facilitate the at least one neural network for determining features of an object or its part present in the 3D space at different resolutions. Such an encoding is well-known in the art, and thus could be performed using well-known arithmetic approaches (for example, such as frequency encoding), or could be implemented as a part of training the at least one neural network (for example, by positional encoding, sparse grid embeddings, or any other similar technique).

Throughout the present disclosure, the term "output colour image" refers to a reconstructed colour image that is a visual representation of the given real-world environment from the perspective of the new viewpoint, said visual representation being generated using both the 3D data structure and the at least one neural network. Optionally, the given output colour image is to be displayed at the device, using at least one light source. Optionally, the device is associated with a user. Optionally, the at least one light source is implemented as a display or a projector. Displays and projectors are well-known in the art.

The set of visible nodes in the 3D data structure whose corresponding voxels are visible from the new viewpoint are determined as nodes lying in a field of view along a viewing direction defining the perspective from the new viewpoint. In this regard, said viewing direction may be mapped onto the 3D data structure for determining the set of visible nodes. The set of visible nodes comprises at least one node in the 3D data structure. It will be appreciated that information pertaining to the new viewpoint could be received by the at least one server from the device. Upon performing the reconstruction, the at least one server sends the given output colour image to the device, for subsequent displaying thereat.

Since the given visible node of said set stores viewpoint information indicative of viewpoints from which depth images are captured along with any of: the depth tiles, or reference information of said depth tiles, the at least one server can easily and accurately select the at least one depth tile (for the given visible node) whose corresponding viewpoint matches the new viewpoint most closely. It will be appreciated that when a viewpoint from which the at least one (selected) depth tile has been captured is different from the new viewpoint, there would be some offset/skewness in the at least one depth tile from the perspective of the new viewpoint. In such a case, prior to reconstruct the 2D geometry of the objects represented by the pixels of the given output colour image, the at least one server is optionally configured to reproject the at least one depth tile to match the perspective of the new viewpoint, according to a difference between the viewpoint corresponding to the at least one (selected) depth tile and the new viewpoint. Optionally, in this regard, the at least one server is configured to employ at least one image reprojection algorithm. Image reprojection algorithms are well-known in the art.

Throughout the present disclosure, the term "two-dimensional geometry" of a given object refers to a projection of a 3D geometry of the given object onto a 2D image plane when the given object is viewed from a perspective of the new viewpoint. It will be appreciated that since depth information captured in the (selected) depth tiles accurately represents optical depths of the objects from the new viewpoint, placements and/or occlusions of the objects from the new viewpoint, and the like, the at least one server can beneficially utilise such depth information to reconstruct the 2D geometry (comprising, for example, at least one of: edges, corners, relative placements) of the objects, for the given output colour image.

Notably, once the 2D geometry of the objects is reconstructed using the depth information from the 3D data structure, the colours of the pixels of the given output colour image are rendered using the at least one neural network. In this regard, a colour and an opacity corresponding to each pixel of the given output colour image are to be determined using the at least one neural network (upon its training). In other words, colours and opacities of different pixels corresponding to different rays that span across an entire field-of-view of the at least one camera from a 3D position and orientation of the new viewpoint would be estimated by the at least one neural network. This will now be discussed in detail hereinbelow.

In an embodiment, the step of utilising the at least one neural network to render the colours comprises:
  processing depth information in depth tiles of the plurality of nodes of the 3D data structure, based on respective viewpoints from which corresponding depth images are captured, to generate a 3D depth model of the given real-world environment;
  determining, from the 3D depth model, an optical depth of a given pixel of the given output colour image that corresponds to a given ray from the new viewpoint, based on a direction of the given ray;
  selecting a lower bound and an upper bound for the given ray, based on the determined optical depth of the given pixel; and
  marching the given ray within the lower bound and the upper bound to render a colour for the given pixel of the given output colour image using the at least one neural network.

Optionally, when processing the depth information to generate the 3D depth model, the at least one server is configured to employ at least one data processing algorithm. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. Optionally, the 3D depth model is in form of at least one of: a 3D point cloud, a 3D polygonal mesh, a 3D surface cloud, a voxel-based model. The 3D polygonal mesh could, for example, be a 3D triangular mesh or a 3D quadrilateral mesh. It will be appreciated that the 3D depth model stores only 3D positions of points in the given real-world environment, i.e., no colour information of said point is stored in the 3D depth model.

It will be appreciated that the depth information in the depth tiles is processed based on the respective viewpoints to enable the at least one server to utilize the optical depths of the objects or their parts when generating the 3D depth model. In such a case, the 3D depth model is accurately and realistically generated, because information pertaining to the optical depths in the given real-world environment is accurately known, to the at least one server, in great detail from various perspectives of viewpoints of the at least one camera that captured the depth images. Thus, the 3D depth model would also be indicative of placements, geometries, occlusions, and the like, of the objects or their parts from said various perspectives.

Since the 3D positions of the points in the given real-world environment are known from the 3D depth model and the 3D position and orientation of the given viewpoint (namely, a 3D position and orientation of the at least one camera) is also known, the optical depth of the given pixel can be easily and accurately determined by finding a given point that lies on the given ray and that is nearest to the 3D position of the given viewpoint. In such a case, it is assumed that the given ray originates from the given viewpoint.

It will be appreciated that a (single) given colour image has multiple rays (corresponding to respective pixels of the given colour image) whose directions are different from each other, because said multiple rays span across the entire field-of-view of the at least one camera. In other words, the given ray for the given pixel corresponds to a direction pointing from the 3D position of the given viewpoint towards a point in the given real-world environment that is represented by the given pixel. Optionally, the at least one server is configured to determine the direction of the given ray for the given pixel, based on the 3D position of the given viewpoint, at least one intrinsic parameter of the at least one camera, and pixel coordinates of the given pixel in the given output colour image. Beneficially, for each pixel in the given output colour image, a direction of a corresponding ray can be determined easily and accurately, and thus there would not be any need to store additional ray direction information in the given node of the 3D data structure. The at least one intrinsic parameter of the at least one camera could, for example, comprise at least one of: the field-of-view, a focal length, an aperture, a resolution, of the at least one camera. The given colour image encompasses the given output colour image.

Once the optical depth of the given pixel is determined, the given ray, for example, is to be marched in between two particular bounds (namely, two particular limits) for training the at least one neural network. In this regard, the lower bound and the upper bound for the given ray are selected according to the determined optical depth of the given pixel. For example, the lower bound may be equal to a value lesser than the determined optical depth by a predefined percentage, whereas the upper bound may be equal to a value greater than the determined optical depth by the predefined percentage. Such a predefined percentage may, for example, be defined by taking into account error margins in the depth information, as described later.

It will be appreciated that the lower bound and the upper bound define a distance between which the given ray is to be marched for training the at least one neural network. In other words, the given ray is marched through voxels in the 3D grid that lie on a path of the given ray. Thus, a colour and an opacity of the point (in the given real-world environment) that lies on the given ray can be known to the at least one server from node(s) (of the 3D data structure) in which any of: colour tiles and depth tiles, or reference information corresponding to said voxel(s) are stored. The colour and the opacity of the point are the colour and an opacity for the given pixel of the given output colour image, respectively. Ray marching is well-known in the art. It will be appreciated that such a ray marching is typically performed at a granularity level of the at least one neural network that is considerably finer than a granularity level of the 3D grid. The voxels may, for example, be cubes of 10 centimetres, and may only be employed for indexing visual representation of the colour tiles. A step size for the ray marching may be dependent on an implicit resolution of the at least one neural network. It will also be appreciated that instead of performing the ray marching for each pixel for an entire length of an optical depth, a starting point for the ray marching is truncated to the lower bound for the given ray. Beneficially, the training of the at least one neural network is fast, more accurate, and reliable. Moreover, ray marching for volume rendering performed in this way is relatively simple, easy, and takes lesser time as compared to ray marching for volume rendering performed in the prior art. Moreover, such ray marching also eliminates formation of cloud-like foreground artifacts, that are unavoidable with the prior art.

Optionally, when training the at least one neural network, the at least one server is configured to force an opacity function of the at least one neural network to return a zero value for any sample point on the given ray before the lower bound. In this regard, when an opacity of a given sample point (lying before the lower bound) is non-zero, it means that some density is present at the given sample point (for example, due to some opaque object or its part). Thus, the (currently selected) lower bound is inaccurate and unreliable for training the at least one neural network, and thus may be modified accordingly. Therefore, it is ensured that the opacity function would return the zero value for any sample point on the given ray before the lower bound. The term "opacity function" refers to a mathematical function used for determining the opacity (namely, a density) of the given sample point that lies on the given ray.

Optionally, the lower bound and the upper bound for the given ray are selected, further based on error margins in the depth information. In a case where the depth images are captured using a depth sensor of the at least one camera, it is likely that there could be some error (namely, uncertainty) in the depth information and thus in the (generated) 3D depth model. Such depth uncertainty can be constant based on known depth sensor properties or can be derived from a variance of depth samples along each ray originating from a given viewpoint of the at least one camera. Therefore, in order to take into account such depth uncertainty, the lower bound is selected by subtracting an error margin from the determined optical depth of the given pixel, while the upper bound is selected by adding an error margin to the determined optical depth of the given pixel. Such an error margin may, for example, be a predefined percentage of the determined optical depth, a fixed depth value (for example, in millimetres, centimetres, or metres), or similar. The error margins may depend on specifications of the depth sensor. Beneficially, selecting the lower bound and the upper bound in this manner facilitates in performing the training of the at least one neural network accurately and reliably. In an example, the determined optical depth of the pixel may be 10 meters, and an error margin may be 5 percent of the determined optical depth. Thus, the lower bound and the upper bound are selected as 9.5 meters and 10.5 meters, respectively.

Additionally or alternatively, optionally, the lower bound and the upper bound for the given ray are selected, further based on optical depths of neighbouring pixels corresponding to neighbouring rays of the given ray from the 3D position of the given viewpoint. Optionally, the optical depths of the neighbouring pixels are determined from the 3D depth model, based on directions of the neighbouring rays.

In this regard, the neighbouring pixels may lie within a predefined threshold angle and/or within a predefined threshold area from (a location of) the given pixel corresponding to the given ray. When two or more objects appear to be in vicinity in the given output colour image, but said objects actually have different optical depths, features (such as edges) of said objects may have been misinterpreted by the depth sensor, and thus their optical depths might be erroneously captured in a depth image. Therefore, when the lower bound and the upper bound are selected based on the (determined) optical depths of the neighbouring pixels, marching of the given ray for training the at least one neural network can be performed more accurately and reliably. Resultantly, it can be ensured that the features of said objects are well-recognised by the at least one (trained) neural network, and thus said feature can be well-represented in the given output colour image.

In an example, the determined optical depth of the given pixel may be 5 meters, determined optical depths of two neighbouring pixels may be 4 meters and 6 meters, respectively, and an error margin for each pixel may be 0.5 meters. Thus, the lower bound and the upper bound are selected as 3.5 meters and 6.5 meters, respectively. In this example, even when the error margin is not given, the lower bound and the upper bound can still be selected as 4 meters and 6 meters, respectively.

In an additional or alternative embodiment, the step of utilising the at least one neural network to render the colours comprises:
- determining 3D positions of points in the given real-world environment that are represented by pixels of the given output colour image, based on the new viewpoint and depth information captured in the depth tiles that are selected for each visible node of the set; and
- providing the determined 3D positions of the points as an input to the at least one neural network to obtain colours for the pixels of the given output colour image as an output.

In this regard, instead of performing the ray marching between the lower bound and the upper bound for each point that lies on (the path of) the given ray, the ray marching can be performed at a specific optical depth along the given ray. In other words, the given ray can be marched at only a single point (that is represented by a given pixel of the given output colour image) that lies on the given ray. Beneficially, this facilitates in saving processing time and processing resources of the at least one server as marching of the given ray need not necessarily be performed. However, it will be appreciated that the colours for the pixels obtained in the aforesaid manner and the colours for the pixels obtained by marching the given ray within the lower bound and the upper bound could be averaged to obtain final colours for the pixels of the given output colour image.

Since the depth information comprising optical depths of the pixels of the given output colour image is known, and a 3D position and orientation of the new viewpoint is also known, the 3D positions of the points in the given real-world environment can be easily and accurately determined, for example, by using at least one mathematical technique. Such at least one mathematical technique may utilise said optical depths as offsets from the 3D position of the new viewpoint for calculating the 3D positions of the points, and may be based on coordinate geometry. As discussed earlier, upon training the at least one neural network by utilising the 3D data structure, when the determined 3D positions of the points are provided as the input to the at least one neural network, the colours for the pixels of the given output colour image can be easily obtained, for example, by using the aforementioned mathematical expression when the at least one neural network is the NeRF model. Optionally, corresponding rays from the new viewpoint are also provided as the input to the at least one neural network, in addition to the determined 3D positions of the points. Advantageously, in such a case, the (obtained) colours for the pixels of the given output colour image would be view-dependent colours (or view-dependent irradiances). Therefore, the given output colour image is highly accurately and realistically generated, which potentially enhances a viewing experience of the user when the given output colour image is shown to the user.

Furthermore, in an embodiment, the method further comprises:
  processing depth information in depth tiles of the plurality of nodes of the 3D data structure, based on respective viewpoints from which corresponding depth images are captured, to generate a 3D depth model of the given real-world environment;
  determining a measured 3D position of a given point in the given real-world environment that lies on a path of a given ray from a given viewpoint, based on the 3D depth model and a direction of the given ray;
  identifying a given voxel of the 3D grid that lies on a path of the given ray and inside which the given point lies;
  dividing the given voxel into a sub-grid of sub-voxels;
  identifying a sub-voxel of the sub-grid inside which the given point lies, based on the measured 3D position of the given point;
  determining two intersection points on the sub-voxel at which the given ray intersects with two respective faces of the sub-voxel;
  selecting an intersection point from amongst the two intersection points that is closest to the given point; and
  updating the 3D depth model by replacing the measured 3D position of the given point with a 3D position of the selected intersection point.

In this regard, as the depth images are captured using the depth sensor, it is likely that there could be some uncertainty in the depth information and thus in the (generated) 3D depth model. Therefore, in order to take into account such depth uncertainty, and to improve accuracies in the 3D positions of the points in the 3D depth model, the 3D depth model is updated in the aforesaid manner. The step of processing the depth information to generate the 3D depth model has already been discussed earlier in detail.

Since 3D positions of all the points in the given real-world environment are known from the 3D depth model, and the direction of the given ray originating from the given viewpoint is also known, the given ray can be mapped onto the 3D depth model to determine the measured 3D position of the given point. Similarly, when identifying the given voxel of the 3D grid, the at least one server maps the given ray onto the 3D grid in the direction of the given ray. In such a case, the given ray may traverse through several voxels of the 3D grid that lie on the path of the given ray, and a particular voxel of the 3D grid inside which the given point lies is identified as the given voxel.

Optionally, the at least one server is configured to divide the given voxel into the sub-grid of sub-voxels using the space partitioning scheme. Examples of the space partitioning scheme have already been discussed earlier. Herein, the term "sub-voxel" refers to a portion of the given voxel. A shape of a given sub-voxel could be a cube, a cuboid or some other convex polyhedron. Sub-voxels are well-known in the art. Upon the aforesaid division, the given voxel is stratified into the sub-voxels. It will be appreciated that since both the measured 3D position of the given point, and the given voxel inside which the given point lies are known to the at least one server, the sub-voxel inside which the given point lies can be easily identified. Furthermore, when the given ray traverses through the sub-voxel, a first intersection point (amongst the two intersection points) is determined on the sub-voxel at an entry of the given ray through a given face of the sub-voxel, and a second intersection point (amongst the two intersection points) is determined on the sub-voxel at an exit of the given ray from another given face of the sub-voxel. The intersection point (i.e., one of the first intersection point and the second intersection point) that is closest to the given point is selected, as it would be more relevant to the given point. Therefore, instead of using the measured 3D position of the given point, the 3D position of the selected intersection point is used as an actual 3D position of the given point, and thus it is updated in the 3D depth model. Optionally, depth tiles from which the position of the given point was determined are also updated in the 3D data structure. It will be appreciated that the stratification of the given voxel into the sub-grid of sub-voxels can be performed for a regular sub-grid having a same granularity along each of its axis, or by using adaptive mapping in which a non-regular sub-grid has different granularities along its different axis (as discussed later).

Optionally, a Z-axis of the sub-grid is aligned according to a mean of surface normals of surfaces present in the given voxel. In this regard, the Z-axis of the sub-grid is oriented along a direction of the mean of surface normals of surfaces present in the given voxel. Herein, the term "surface normal" refers to a vector that is perpendicular to a given surface at a given point on the given surface. Optionally, for determining the mean of the surface normals of the surfaces present in the given voxel, the at least one server is configured to: extract surface normals at different points on each surface present in the given voxel; determine a resultant surface normal by taking a vector sum of the surface normals and dividing the vector sum by a total number of points at which the surface normals have been extracted, the resultant surface normal being the mean of surface normals. This has been illustrated in conjunction with FIGS. 4A and 4B, for sake of better understanding and clarity. Alternatively, optionally, the Z-axis of the sub-grid is aligned with a Z-axis of the 3D grid of voxels representing the 3D space of the given real-world environment. However, the Z-axis of the sub-grid need not necessarily be aligned with the Z-axis of the 3D grid of voxels.

Optionally, a granularity of the sub-grid along its Z-axis is coarser than a granularity of the sub-grid along its X-axis and a granularity of the sub-grid along its Y-axis. In this regard, a length of a given sub-voxel of the sub-grid along its Z-axis is considerably greater as compared to a length of the given sub-voxel of the sub-grid along its X-axis and a length of the given sub-voxel of the sub-grid along its Y-axis. This means that a step size of the sub-grid is larger along the Z-axis, as compared to a step size of the sub-grid along the X-axis and a step size of the sub-grid along the Y-axis. In other words, a number of steps along the Z-axis is smaller as compared to a number of steps along the X-axis and a number of steps along the Y-axis. This has been illustrated in conjunction with FIG. 4C, for sake of better understanding. It will be appreciated that the aforesaid sub-grid may have different granularities in the X-axis and the Y-axis. Moreover, it will also be appreciated that the aforesaid sub-grid may alternatively have a same granularity in the X-axis, the Y-axis, and the Z-axis.

The technical benefit of aligning the Z-axis of the sub-grid along the mean of the surface normal, and having a coarser granularity of the sub-grid along its Z-axis (as compared to the X-axis and the Y-axis) is that errors in measuring an optical depth of a given point on a given surface from a given viewpoint that lies along a surface normal at the given point are reduced. In other words, the aforesaid alignment of the Z-axis and the coarser granularity along the Z-axis takes into account a fact that an error in measuring a position of the given point is most likely higher along the Z-axis than along the X-axis or the Y-axis, when the optical depth is measured along the surface normal. This allows for the two intersection points to be determined accurately for any given viewpoint, for subsequently updating the 3D depth model (as explained earlier). In other words, when the optical depth of the given point is measured from a given viewpoint along the X-axis or the Y-axis, a distance between the two intersection points would be much smaller, as compared to when the optical depth of the given point is measured from another given viewpoint along the Z-axis. This takes into account a fact that when the depth images are captured, depth uncertainty along a surface normal is significantly higher as compared to depth uncertainties along a perpendicular direction.

Optionally, the method further comprises:
utilising an opacity function of the at least one neural network, after training, to determine opacities of a plurality of sample points lying on a path of a given ray;
identifying a sample point having a highest opacity from amongst the plurality of sample points;
determining an optical depth of a pixel corresponding to the given ray as a distance of the identified sample point from a given viewpoint; and
updating a corresponding depth tile with the determined optical depth of the pixel.

In this regard, the opacity function (described earlier) can be easily utilised for determining the opacities/densities of the plurality of sample points. Densities of the plurality of sample points can be compared with each other for identifying the sample point having the highest opacity. Instead of determining the optical depth of the pixel from the depth information in the depth tiles, the distance of the identified sample point from the 3D position of the given viewpoint is determined as the optical depth of the pixel. Thus, the corresponding depth tile is updated (namely, augmented) with the determined optical depth of the pixel, which is more accurate than the depth information originally captured in a given depth tile. This is done because the depth information in the depth tiles could be inaccurate or obsolete, for example, due to errors in depth estimation by the depth sensor, due to some dynamic changes in the given real-world environment, or similar. Therefore, the optical depth of the pixel determined in the aforesaid manner using the at least one (trained) neural network is highly accurate and up-to-date.

Optionally, the method further comprises:
identifying an object edge in the reconstructed 2D geometry of the objects; and
for a given pixel lying on the object edge or in a proximity of the object edge,
utilising an opacity function of the at least one neural network, after training, to determine opacities of a plurality of sample points lying on a path of a given ray from the new viewpoint corresponding to the given pixel;
identifying a sample point having a highest opacity from amongst the plurality of sample points;
determining an optical depth of the given pixel as a distance of the identified sample point from the new viewpoint; and
updating the reconstructed 2D geometry of the objects, based on the determined optical depth.

In this regard, the at least one server may utilise high-resolution depth images for training the at least one neural network. Once the at least one neural network is trained, the at least one server may then downscale the high-resolution depth images to generate low-resolution depth images, and store depth tiles of the low-resolution depth images or reference information of said depth tiles in the plurality of nodes of the 3D data structure. In such a scenario, depth estimates for features (for example, edges, corners, silhouettes) represented in the reconstructed 2D geometry of the objects (that is generated using the depth information from the 3D data structure) may likely to be less accurate and imprecise. In other words, the depth estimates for such features would be coarse. Therefore, the at least one neural network utilises the opacity function in the aforesaid manner for refining the depth estimates (for example, at the object edge in the reconstructed 2D geometry) that are initially made using the depth information from the 3D data structure. In the above scenario, it is assumed that only static objects are present in the given real-world environment. Dynamic content present in the given real-world environment can also be supported by concentrating training samples on changed (i.e., dynamic) portions of the given real-world environment. Downscaling an image is well-known in the art, and facilitates in saving storage space at the at least one data repository in which the 3D data structure is stored.

It will be appreciated that since the 2D geometry of the objects is reconstructed using the depth information, object edges in the reconstructed 2D geometry can be easily identified by the at least one server by analysing said depth information. The at least one server may also employ at least one edge detection algorithm for identifying the object edges in the reconstructed 2D geometry. Such edge detection algorithms are well-known in the art. Utilising the opacity function for determining the densities of the plurality of sample points and identification of the sample point having the highest opacity are performed in a same manner as described earlier. Instead of determining the optical depth of the given pixel from the depth information in the depth tiles, the distance of the identified sample point from a 3D position of the new viewpoint is determined as the optical depth of the given pixel. Thus, the (old) optical depth for the given pixel lying on the object edge or in the proximity of the object edge is updated (namely, augmented) with the determined (new) optical depth, which is highly accurate and up-to-date than the (old) optical depth. In this manner, the given output colour image thus generated would be highly accurate and realistic. This may enhance the viewing experience of the user when the given output colour image is shown to the user.

The present disclosure also relates to the system and to the computer program product as described above. Various embodiments and variants disclosed above, with respect to the aforementioned method, apply mutatis mutandis to the system and to the computer program product.

Optionally, when obtaining the 3D data structure, the at least one server is configured to:
  receive a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
  divide the 3D space occupied by the given real-world environment into the 3D grid of voxels, wherein the 3D grid is represented in the given coordinate system;
  create the 3D data structure;
  divide the given colour image and the given depth image into a plurality of colour tiles and a plurality of depth tiles, respectively, wherein the plurality of depth tiles correspond to respective ones of the plurality of colour tiles;
  map the given colour tile of the given colour image to the given voxel in the 3D grid whose colour information is captured in the given colour tile, based on the given viewpoint and the depth information captured in the corresponding depth tile of the given depth image; and
  store, in the given node of the 3D data structure that represents the given voxel, the given viewpoint information indicative of the given viewpoint, along with any of: (i) the given colour tile and the corresponding depth tile, (ii) the reference information.

In an embodiment, when utilising the at least one neural network to render the colours, the at least one server is configured to:
  process depth information in depth tiles of the plurality of nodes of the 3D data structure, based on respective viewpoints from which corresponding depth images are captured, to generate a 3D depth model of the given real-world environment;
  determine, from the 3D depth model, an optical depth of a given pixel of the given output colour image that corresponds to a given ray from the new viewpoint, based on a direction of the given ray;
  select a lower bound and an upper bound for the given ray, based on the determined optical depth of the given pixel; and
  march the given ray within the lower bound and the upper bound to render a colour for the given pixel of the given output colour image using the at least one neural network.

In an alternative or additional embodiment, when utilising the at least one neural network to render the colours, the at least one server is configured to:
  determine 3D positions of points in the given real-world environment that are represented by pixels of the given output colour image, based on the new viewpoint and depth information captured in the depth tiles that are selected for each visible node of the set; and
  provide the determined 3D positions of the points as an input to the at least one neural network to obtain colours for the pixels of the given output colour image as an output.

Optionally, the at least one server is configured to:
process depth information in depth tiles of the plurality of nodes of the 3D data structure, based on respective viewpoints from which corresponding depth images are captured, to generate a 3D depth model of the given real-world environment;
determine a measured 3D position of a given point in the given real-world environment that lies on a path of a given ray from a given viewpoint, based on the 3D depth model and a direction of the given ray;
identify a given voxel of the 3D grid that lies on a path of the given ray and inside which the given point lies;
divide the given voxel into a sub-grid of sub-voxels;
identify a sub-voxel of the sub-grid inside which the given point lies, based on the measured 3D position of the given point;
determine two intersection points on the sub-voxel at which the given ray intersects with two respective faces of the sub-voxel;
select an intersection point from amongst the two intersection points that is closest to the given point; and
update the 3D depth model by replacing the measured 3D position of the given point with a 3D position of the selected intersection point.

Optionally, a Z-axis of the sub-grid is aligned according to a mean of surface normals of surfaces present in the given voxel.

Optionally, a granularity of the sub-grid along its Z-axis is coarser than a granularity of the sub-grid along its X-axis and a granularity of the sub-grid along its Y-axis.

Optionally, the at least one server is configured to:
utilise an opacity function of the at least one neural network, after training, to determine opacities of a plurality of sample points lying on a path of a given ray;
identify a sample point having a highest opacity from amongst the plurality of sample points;
determine an optical depth of a pixel corresponding to the given ray as a distance of the identified sample point from a given viewpoint; and
update a corresponding depth tile with the determined optical depth of the pixel.

Optionally, the at least one server is configured to:
identify an object edge in the reconstructed 2D geometry of the objects; and
for a given pixel lying on the object edge or in a proximity of the object edge,
  utilise an opacity function of the at least one neural network, after training, to determine opacities of a plurality of sample points lying on a path of a given ray from the new viewpoint corresponding to the given pixel;

identify a sample point having a highest opacity from amongst the plurality of sample points;

determine an optical depth of the given pixel as a distance of the identified sample point from the new viewpoint; and update the reconstructed 2D geometry of the objects, based on the determined optical depth.

DETAILED DESCRIPTION OF THE DRAWINGS

Referring to FIG. 1, illustrated is a block diagram of an architecture of a system 100 for image-based environment reconstruction with view-dependent colour, in accordance with an embodiment of the present disclosure. The system 100 comprises at least one server (depicted as a server 102). Optionally, the system 100 further comprises at least one data repository (depicted as a data repository 104) that is communicably coupled to the server 102.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2A:
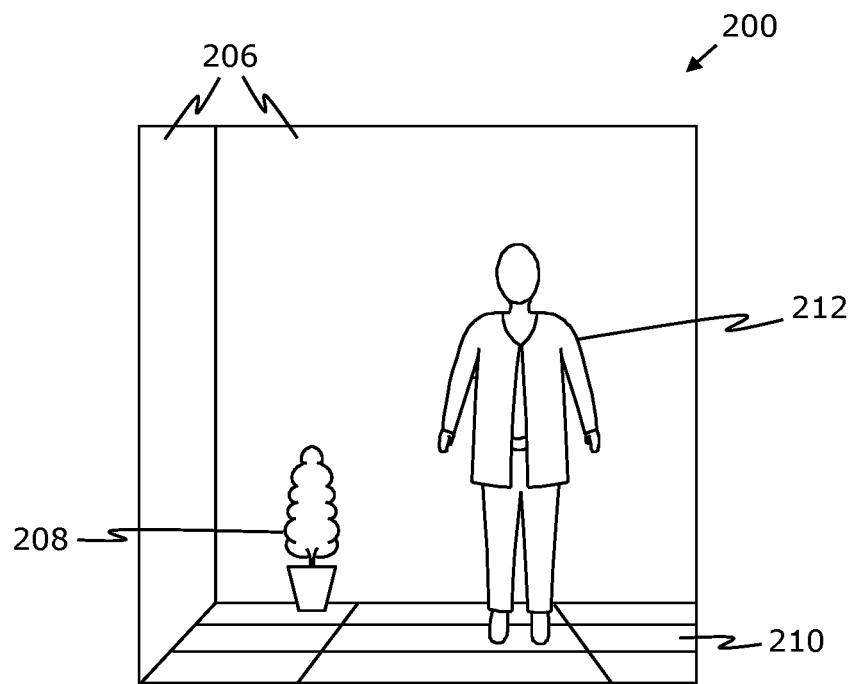
FIG. 2A is a schematic representation of an exemplary colour image of a real-world environment.
Figure 2B:
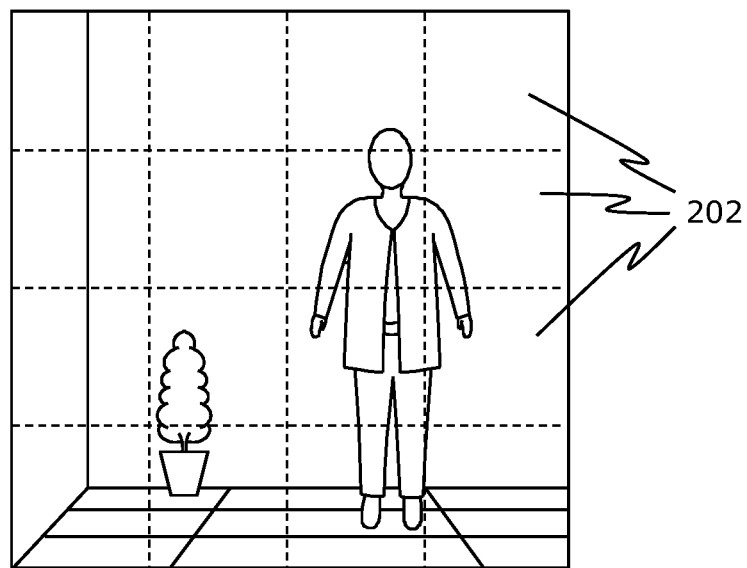
Figure 2C:
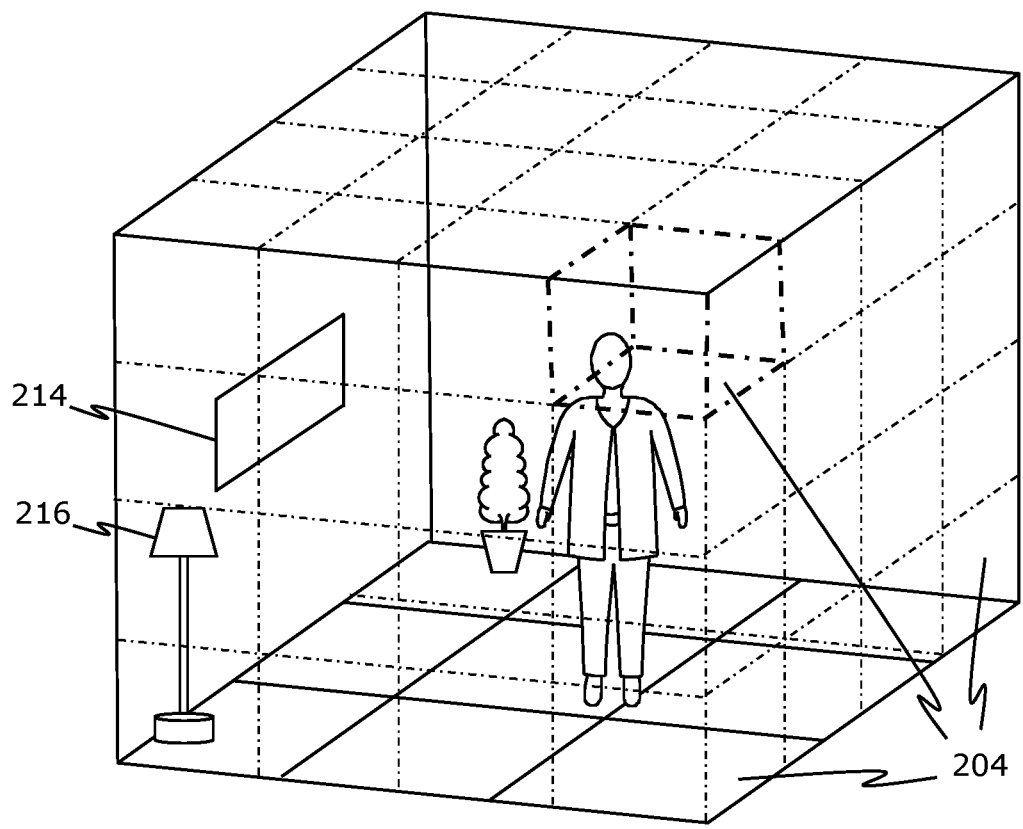
FIG. 2C is a schematic representation of a three-dimensional (3D) space occupied by the real-world environment being divided into a 3D grid of voxels, in accordance with an embodiment of the present disclosure.

Referring to FIGS. 2A, 2B, and 2C, FIG. 2A is a schematic representation of an exemplary colour image 200 of a real-world environment, FIG. 2B is a schematic representation of how the colour image 200 can be divided into a plurality of colour tiles 202, while FIG. 2C is a schematic representation of a three-dimensional (3D) space occupied by the real-world environment being divided into a 3D grid of voxels 204, in accordance with an embodiment of the present disclosure.

With reference to FIG. 2A, the colour image 200 is captured using a camera (not shown) from a particular pose of the camera. The colour image 200 represents a living room in the real-world environment, the living room comprising a plurality of objects 206, 208, 210, 212, 214 and 216, depicted as walls, an indoor plant, a tiled floor, a human, a television and a lamp, respectively.

With reference to FIG. 2B, the colour image 200 is shown to be divided into 16 equi-sized colour tiles 202 (depicted as a 4×4 grid of dashed lines), for sake of simplicity. Similarly, a depth image (not shown) corresponding to the colour image 200 is divided into a plurality of depth tiles, wherein the plurality of depth tiles correspond to respective ones of the plurality of colour tiles 202.

With reference to FIG. 2C, the 3D space represents the living room in the real-world environment. The 3D space is shown to be divided into the 3D grid of 64 equi-sized voxels 204 (depicted as a 4×4×4 3D grid of dash-dot lines). For sake of simplicity, the 3D space is divided into only 64 voxels, and one of the 64 voxels that is located at an upper right corner of the 3D space is shown in a complete 3D form.

Figure 3A:
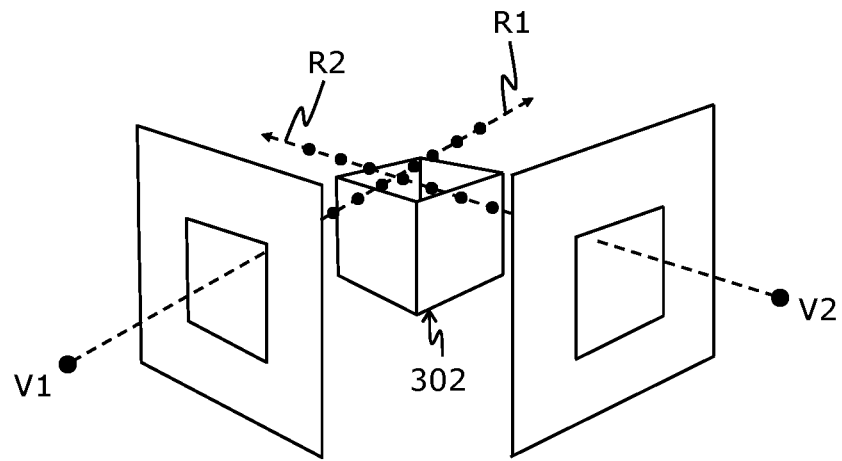
FIGS. 3A and 3B illustrate how marching of a ray is performed during training of a neural network, in accordance with an embodiment of the present disclosure.
Figure 3B:
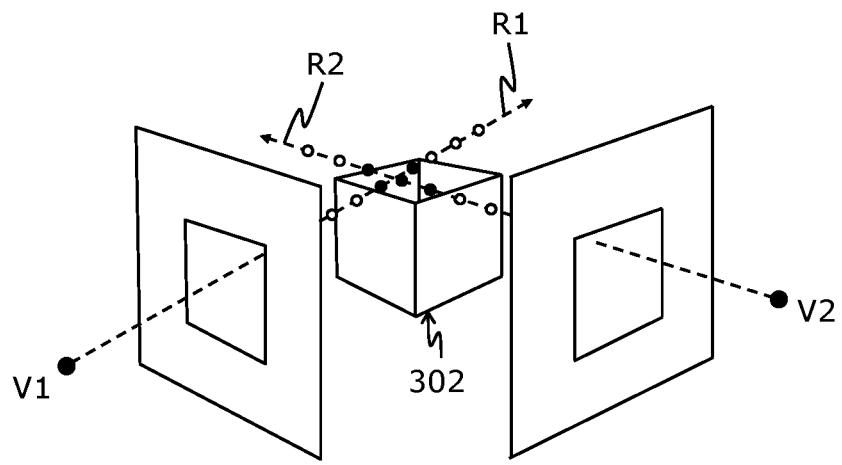

Referring to FIGS. 3A and 3B, illustrated is how marching of a ray is performed during training of a neural network, in accordance with an embodiment of the present disclosure. With reference to FIGS. 3A and 3B, an object 302 present in a real-world environment is being imaged from two different viewpoints V1 and V2 in the real-world environment. Different sample points (for example, depicted as solid black colour dots) are shown to lie on rays R1 and R2 originating from 3D positions of the two different viewpoints V1 and V2, respectively. The different sample points correspond to different 3D positions in the real-world environment.

Referring to FIG. 3B, as shown, some sample points from amongst the different sample points (for example, sample points depicted using solid black colour dots) fall on a surface of the object 302, while other sample points from amongst the different sample points (for example, sample points depicted using hollow dots) fall outside any surface of the object. The rays R1 and R2 are marched for the different sample points in order to train the neural network. Upon training, colours and opacities of some sample points (namely, colours and opacities of real-world points corresponding to the different 3D positions) can be determined using the (trained) neural network. Other sample points do not have any colours and opacities. As an example, such sample points represent empty spaces (around the object 302) in the real-world environment.

Figure 4A:
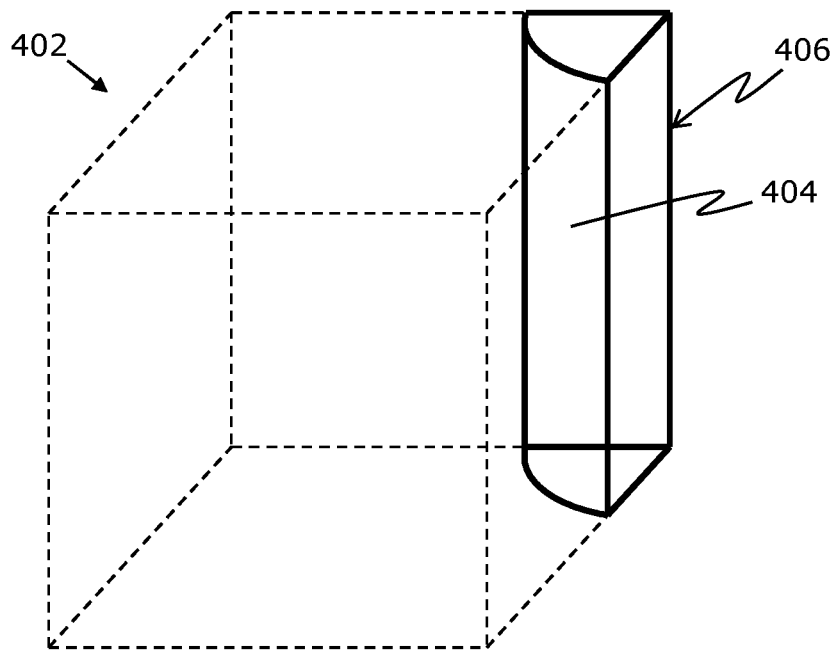
FIG. 4A illustrates a voxel of a 3D grid.
Figure 4B:
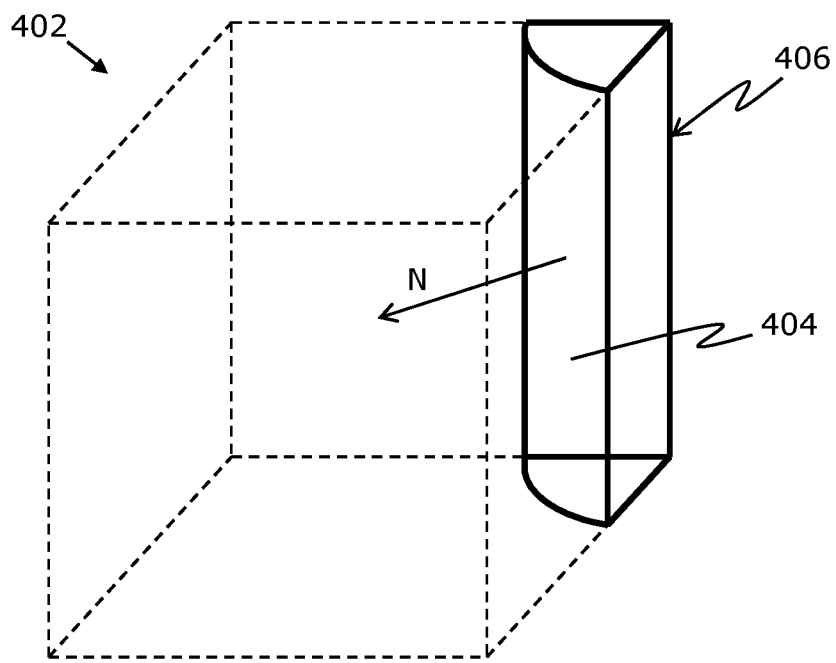
Figure 4C:
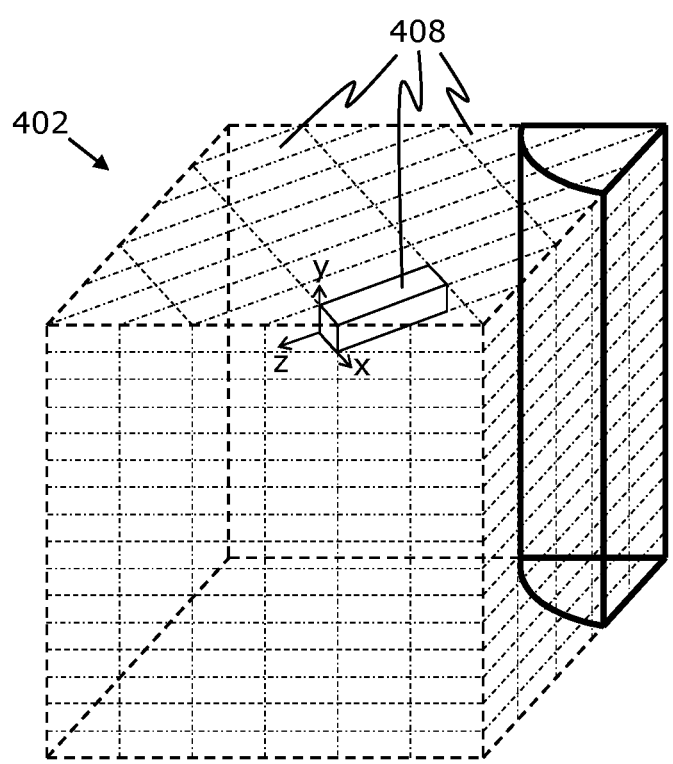
FIG. 4C illustrates the voxel being into a sub-grid of sub-voxels, in accordance with an embodiment of the present disclosure.

Referring to FIGS. 4A, 4B, and 4C, FIG. 4A illustrates a voxel 402 (depicted as a dashed line cube) of a 3D grid (not shown), FIG. 4B illustrates a mean surface normal 'N' of a surface 404 of an object 406 (depicted as a cylindrical sector) present in the voxel 402, while FIG. 4C illustrates the voxel 402 being divided into a sub-grid of sub-voxels 408, in accordance with an embodiment of the present disclosure. With reference to FIG. 4A, the voxel 402 is shown to include the object 406 whose (curved) surface 404 lies inside the voxel 402. With reference to FIG. 4B, the mean surface normal 'N' is a mean (namely, an average) of surface normals of the surface 404 of the object 406 present in the voxel 402. The mean surface normal 'N' is shown to be oriented along a direction that is parallel to a diagonal of a top face of the voxel 402 and is perpendicular to another diagonal of the top face of the voxel 402. With reference to FIG. 4C, a Z-axis of the sub-grid is shown to be aligned according to a direction of the mean surface normal 'N'. Furthermore, an X-axis and a Y-axis of the sub-grid are mutually perpendicular to the Z-axis. The voxel 402 is shown to be divided into the sub-grid of sub-voxels 408 in a manner that a granularity of the sub-grid along its Z-axis is optionally coarser than a granularity of the sub-grid along its X-axis and a granularity of the sub-grid along its Y-axis. In other words, a length of a given sub-voxel of the sub-grid along its Z-axis is considerably greater as compared to a length of the given sub-voxel along its X-axis and a length of the given sub-voxel along its Y-axis. Thus, a step size of the sub-grid is larger along the Z-axis, as compared to a step size of the sub-grid along the X-axis and a step size of the sub-grid along the Y-axis. In addition to this, a number of steps along the Z-axis is smaller as compared to a number of steps along the X-axis and a number of steps along the Y-axis.

FIGS. 2A-2C, 3A-3B, and 4A-4C are merely examples, which should not unduly limit the scope of the claims herein. A person skilled in the art will recognize many variations, alternatives, and modifications of embodiments of the present disclosure.

Figure 5:
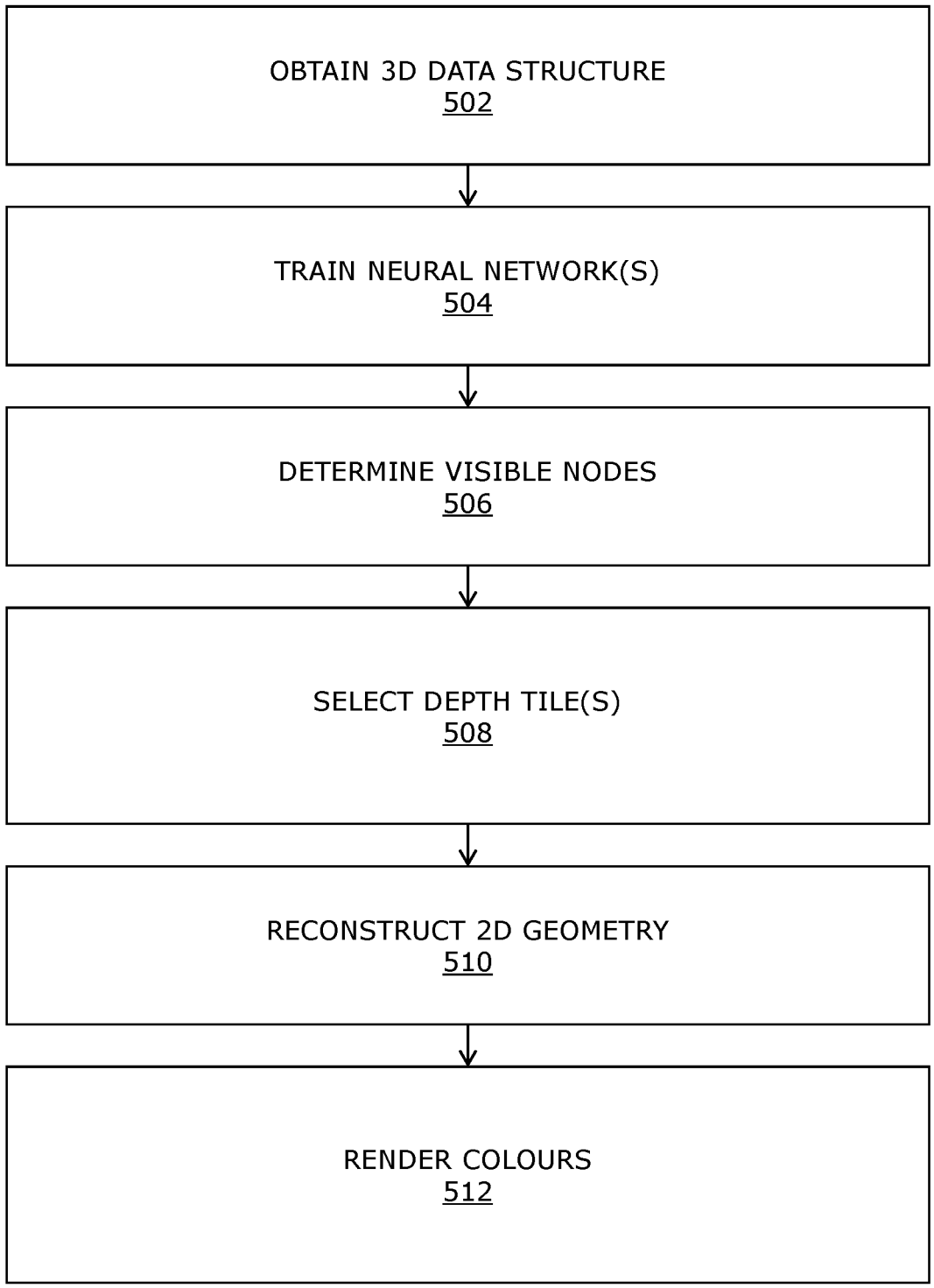
FIG. 5 illustrates steps of a computer-implemented method for image-based environment reconstruction with view-dependent colour, in accordance with an embodiment of the present disclosure.

Referring to FIG. 5, illustrated are steps of a computer-implemented method for image-based environment reconstruction with view-dependent colour, in accordance with an embodiment of the present disclosure. At step 502, a three-dimensional (3D) data structure comprising a plurality of nodes is obtained, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of: (i) a given colour tile of the given colour image that captures colour information of a given voxel represented by the given node and a corresponding depth tile of the given depth image that captures depth information of the given voxel from a perspective of the given viewpoint, (ii) reference information indicative of unique identification of the given colour tile and the corresponding depth tile. At step 504, the 3D data structure is utilised for training at least one neural network, wherein a given input of the at least one neural network comprises information indicative of a 3D position of a given point in the given real-world environment and a given output of the at least one neural network comprises a colour and an opacity of the given point. For a new viewpoint from a perspective of which a given output colour image is to be reconstructed, at step 506, a set of visible nodes is determined in the 3D data structure whose corresponding voxels are visible from the new viewpoint. At step 508, for a given visible node of said set, at least one depth tile whose corresponding viewpoint matches the new viewpoint most closely is selected from amongst depth tiles of the given visible node. At step 510, a two-dimensional (2D) geometry of objects represented by pixels of the given output colour image is reconstructed, from depth tiles that are selected for each visible node of said set. At step 512, the at least one neural network is utilised to render colours for the pixels of the given output colour image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method comprising:
    obtaining a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
        (i) a given colour tile of the given colour image that captures colour information of a given voxel represented by the given node and a corresponding depth tile of the given depth image that captures depth information of the given voxel from a perspective of the given viewpoint,
        (ii) reference information indicative of unique identification of the given colour tile and the corresponding depth tile;
    utilising the 3D data structure for training at least one neural network, wherein a given input of the at least one neural network comprises information indicative of a 3D position of a given point in the given real-world environment and a given output of the at least one neural network comprises a colour and an opacity of the given point; and
    for a new viewpoint from a perspective of which a given output colour image is to be reconstructed,
        determining a set of visible nodes in the 3D data structure whose corresponding voxels are visible from the new viewpoint;
        for a given visible node of said set, selecting, from amongst depth tiles of the given visible node, at least one depth tile whose corresponding viewpoint matches the new viewpoint most closely;
        reconstructing, from depth tiles that are selected for each visible node of said set, a two-dimensional (2D) geometry of objects represented by pixels of the given output colour image; and
        utilising the at least one neural network to render colours for the pixels of the given output colour image.

2. The computer-implemented method of claim 1, wherein the step of obtaining the 3D data structure comprises:
    receiving a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
    dividing the 3D space occupied by the given real-world environment into the 3D grid of voxels, wherein the 3D grid is represented in the given coordinate system;
    creating the 3D data structure;
    dividing the given colour image and the given depth image into a plurality of colour tiles and a plurality of depth tiles, respectively, wherein the plurality of depth tiles correspond to respective ones of the plurality of colour tiles;
    mapping the given colour tile of the given colour image to the given voxel in the 3D grid whose colour information is captured in the given colour tile, based on the given viewpoint and the depth information captured in the corresponding depth tile of the given depth image; and
    storing, in the given node of the 3D data structure that represents the given voxel, the given viewpoint information indicative of the given viewpoint, along with any of: (i) the given colour tile and the corresponding depth tile, (ii) the reference information.

3. The computer-implemented method of claim 1, wherein the step of utilising the at least one neural network to render the colours comprises:
    processing depth information in depth tiles of the plurality of nodes of the 3D data structure, based on respective viewpoints from which corresponding depth images are captured, to generate a 3D depth model of the given real-world environment;
    determining, from the 3D depth model, an optical depth of a given pixel of the given output colour image that corresponds to a given ray from the new viewpoint, based on a direction of the given ray;
    selecting a lower bound and an upper bound for the given ray, based on the determined optical depth of the given pixel; and marching the given ray within the lower bound and the upper bound to render a colour for the given pixel of the given output colour image using the at least one neural network.

4. The computer-implemented method of claim 1, wherein the step of utilising the at least one neural network to render the colours comprises:
  determining 3D positions of points in the given real-world environment that are represented by pixels of the given output colour image, based on the new viewpoint and depth information captured in the depth tiles that are selected for each visible node of the set; and
  providing the determined 3D positions of the points as an input to the at least one neural network to obtain colours for the pixels of the given output colour image as an output.

5. The computer-implemented method of claim 1, further comprising:
  processing depth information in depth tiles of the plurality of nodes of the 3D data structure, based on respective viewpoints from which corresponding depth images are captured, to generate a 3D depth model of the given real-world environment;
  determining a measured 3D position of a given point in the given real-world environment that lies on a path of a given ray from a given viewpoint, based on the 3D depth model and a direction of the given ray;
  identifying a given voxel of the 3D grid that lies on a path of the given ray and inside which the given point lies;
  dividing the given voxel into a sub-grid of sub-voxels;
  identifying a sub-voxel of the sub-grid inside which the given point lies, based on the measured 3D position of the given point;
  determining two intersection points on the sub-voxel at which the given ray intersects with two respective faces of the sub-voxel;
  selecting an intersection point from amongst the two intersection points that is closest to the given point; and
  updating the 3D depth model by replacing the measured 3D position of the given point with a 3D position of the selected intersection point.

6. The computer-implemented method of claim 5, wherein a Z-axis of the sub-grid is aligned according to a mean of surface ormal of surfaces present in the given voxel.

7. The computer-implemented method of claim 5, wherein a granularity of the sub-grid along its Z-axis is coarser than a granularity of the sub-grid along its X-axis and a granularity of the sub-grid along its Y-axis.

8. The computer-implemented method of claim 1, further comprising:
  utilising an opacity function of the at least one neural network, after training, to determine opacities of a plurality of sample points lying on a path of a given ray;
  identifying a sample point having a highest opacity from amongst the plurality of sample points;
  determining an optical depth of a pixel corresponding to the given ray as a distance of the identified sample point from a given viewpoint; and
  updating a corresponding depth tile with the determined optical depth of the pixel.

9. The computer-implemented method of claim 1, further comprising:
  identifying an object edge in the reconstructed 2D geometry of the objects; and
  for a given pixel lying on the object edge or in a proximity of the object edge,
    utilising an opacity function of the at least one neural network, after training, to determine opacities of a plurality of sample points lying on a path of a given ray from the new viewpoint corresponding to the given pixel;
    identifying a sample point having a highest opacity from amongst the plurality of sample points;
    determining an optical depth of the given pixel as a distance of the identified sample point from the new viewpoint; and
    updating the reconstructed 2D geometry of the objects, based on the determined optical depth.

10. A system comprising at least one server, wherein the at least one server is configured to:
  obtain a three-dimensional (3D) data structure comprising a plurality of nodes, each node representing a corresponding voxel of a 3D grid of voxels into which a 3D space occupied by a given real-world environment is divided, wherein a given node of the 3D data structure stores given viewpoint information indicative of a given viewpoint from which a given colour image and a given depth image are captured, along with any of:
    (i) a given colour tile of the given colour image that captures colour information of a given voxel represented by the given node and a corresponding depth tile of the given depth image that captures depth information of the given voxel from a perspective of the given viewpoint,
    (ii) reference information indicative of unique identification of the given colour tile and the corresponding depth tile;
  utilise the 3D data structure to train at least one neural network, wherein a given input of the at least one neural network comprises information indicative of a 3D position of a given point in the given real-world environment and a given output of the at least one neural network comprises a colour and an opacity of the given point; and
  for a new viewpoint from a perspective of which a given output colour image is to be reconstructed,
    determine a set of visible nodes in the 3D data structure whose corresponding voxels are visible from the new viewpoint;
    for a given visible node of said set, select, from amongst depth tiles of the given visible node, at least one depth tile whose corresponding viewpoint matches the new viewpoint most closely;
    reconstruct, from depth tiles that are selected for each visible node of said set, a two-dimensional (2D) geometry of objects represented by pixels of the given output colour image; and
    utilise the at least one neural network to render colours for the pixels of the given output colour image.

11. The system of claim 10, wherein when obtaining the 3D data structure, the at least one server is configured to:
  receive a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
  divide the 3D space occupied by the given real-world environment into the 3D grid of voxels, wherein the 3D grid is represented in the given coordinate system;

create the 3D data structure;
divide the given colour image and the given depth image into a plurality of colour tiles and a plurality of depth tiles, respectively, wherein the plurality of depth tiles correspond to respective ones of the plurality of colour tiles;
map the given colour tile of the given colour image to the given voxel in the 3D grid whose colour information is captured in the given colour tile, based on the given viewpoint and the depth information captured in the corresponding depth tile of the given depth image; and
store, in the given node of the 3D data structure that represents the given voxel, the given viewpoint information indicative of the given viewpoint, along with any of: (i) the given colour tile and the corresponding depth tile, (ii) the reference information.

12. The system of claim 10, wherein when utilising the at least one neural network to render the colours, the at least one server is configured to:
process depth information in depth tiles of the plurality of nodes of the 3D data structure, based on respective viewpoints from which corresponding depth images are captured, to generate a 3D depth model of the given real-world environment;
determine, from the 3D depth model, an optical depth of a given pixel of the given output colour image that corresponds to a given ray from the new viewpoint, based on a direction of the given ray;
select a lower bound and an upper bound for the given ray, based on the determined optical depth of the given pixel; and
march the given ray within the lower bound and the upper bound to render a colour for the given pixel of the given output colour image using the at least one neural network.

13. The system of any of claim 10, wherein when utilising the at least one neural network to render the colours, the at least one server is configured to:
determine 3D positions of points in the given real-world environment that are represented by pixels of the given output colour image, based on the new viewpoint and depth information captured in the depth tiles that are selected for each visible node of the set; and
provide the determined 3D positions of the points as an input to the at least one neural network to obtain colours for the pixels of the given output colour image as an output.

14. The system of claim 10, wherein the at least one server is configured to:
process depth information in depth tiles of the plurality of nodes of the 3D data structure, based on respective viewpoints from which corresponding depth images are captured, to generate a 3D depth model of the given real-world environment;
determine a measured 3D position of a given point in the given real-world environment that lies on a path of a given ray from a given viewpoint, based on the 3D depth model and a direction of the given ray;
identify a given voxel of the 3D grid that lies on a path of the given ray and inside which the given point lies;
divide the given voxel into a sub-grid of sub-voxels;
identify a sub-voxel of the sub-grid inside which the given point lies, based on the measured 3D position of the given point;
determine two intersection points on the sub-voxel at which the given ray intersects with two respective faces of the sub-voxel;
select an intersection point from amongst the two intersection points that is closest to the given point; and
update the 3D depth model by replacing the measured 3D position of the given point with a 3D position of the selected intersection point.

15. The system of claim 14, wherein a Z-axis of the sub-grid is aligned according to a mean of surface ormal of surfaces present in the given voxel.

16. The system of claim 14, wherein a granularity of the sub-grid along its Z-axis is coarser than a granularity of the sub-grid along its X-axis and a granularity of the sub-grid along its Y-axis.

17. The system of any of claim 10, wherein the at least one server is configured to:
utilise an opacity function of the at least one neural network, after training, to determine opacities of a plurality of sample points lying on a path of a given ray;
identify a sample point having a highest opacity from amongst the plurality of sample points;
determine an optical depth of a pixel corresponding to the given ray as a distance of the identified sample point from a given viewpoint; and
update a corresponding depth tile with the determined optical depth of the pixel.

18. The system of claim 10, wherein the at least one server is configured to:
identify an object edge in the reconstructed 2D geometry of the objects; and
for a given pixel lying on the object edge or in a proximity of the object edge,
utilise an opacity function of the at least one neural network, after training, to determine opacities of a plurality of sample points lying on a path of a given ray from the new viewpoint corresponding to the given pixel;
identify a sample point having a highest opacity from amongst the plurality of sample points;
determine an optical depth of the given pixel as a distance of the identified sample point from the new viewpoint; and
update the reconstructed 2D geometry of the objects, based on the determined optical depth.

19. A computer program product comprising a non-transitory machine-readable data storage medium having stored thereon program instructions that, when executed by a processor, cause the processor to execute steps of a computer-implemented method of claim 1.

* * * * *